United States Patent [19]

Ngo

[11] Patent Number: 4,547,042

[45] Date of Patent: Oct. 15, 1985

[54] LIQUID CRYSTAL DISPLAY WITH ELECTRODE SHIELDING ANOTHER ELECTRODE

[75] Inventor: Peter D. T. Ngo, Colts Neck, N.J.

[73] Assignee: AT&T Information Systems Inc., Holmdel, N.J.

[21] Appl. No.: 520,695

[22] Filed: Aug. 5, 1983

[51] Int. Cl.⁴ .............................................. G02F 1/133
[52] U.S. Cl. .................................. 350/334; 350/336; 350/339 R
[58] Field of Search .................... 350/334, 336, 339 R, 350/357, 391, 392, 393

[56] References Cited

U.S. PATENT DOCUMENTS

| | | | |
|---|---|---|---|
| 3,914,019 | 10/1975 | Byatt | 350/336 X |
| 4,021,798 | 3/1977 | Kojima et al. | 350/336 X |
| 4,449,125 | 3/1984 | Clerc et al. | 350/336 X |

FOREIGN PATENT DOCUMENTS 2074356 10/1981 United Kingdom ................ 350/334

OTHER PUBLICATIONS

Specification for Model LM-24002G Graphic Display Unit Manufactured by Sharp Electronics Corporation, Jul. 1, 1982.
Luo et al., "A Low Leakage—Current Thin—Film Transistor for Flat—Pannel Displays", 1980 Biennial Display Research Conference, Oct. 1980.

*Primary Examiner*—John K. Corbin
*Assistant Examiner*—David Lewis
*Attorney, Agent, or Firm*—Ronald D. Slusky

[57] ABSTRACT

In a liquid crystal display device, column signals intended to be applied to the liquid crystal material in first and second regions of the device are carried by first and second sets of column conductors disposed adjacent to a first substrate within the first and second regions, respectively. A portion of each second set conductor passes through the first region, but the singals thereon are prevented from being applied to the display material in the first region by using the first set conductors to shield from the display material that portion of each second set conductor which passes through the first region. In particular, the portion of each second set conductor that passes through the first region is disposed behind (relative to the display material) a respective first set conductor and is narrower than that first set conductor. Row signals intended to be applied to the liquid crystal material in the first and second sections are carried by first and second sets of row conductors adjacent to a second substrate within the first and second regions, respectively.

14 Claims, 2 Drawing Figures

LIQUID CRYSTAL DISPLAY WITH ELECTRODE SHIELDING ANOTHER ELECTRODE

BACKGROUND OF THE INVENTION

Digital displays based on liquid crystal technology exhibit many advantageous properties. For example, they are thin and lightweight, exhibit relatively fast switching speed, operate on low voltages, consume a minimum amount of power and provide good viewing contrast. Liquid crystal materials do not have inherent memory, however. That is, an energized liquid crystal display cell will not remain permanently energized once the energizing voltage has been removed.

The lack of inherent memory in a display material is a problem if that material is to be used, for example, in computer terminal displays. This is because it is desirable to incorporate into such displays a matrix addressing scheme wherein a given display cell is addressed by applying coincident signals to a pair of row and column conductors associated with that cell, and when such an addressing scheme is employed, it is not possible to apply a constant voltage to each energized cell. Advantageously, however, in order for a liquid crystal display cell to remain energized, the signal applied to it does not have to be constant. Rather, a liquid crystal cell will remain energized as long as the rms, i.e., average, voltage thereacross is above some minimum level. Thus, the energized cells in a matrix-addressed liquid-crystal display can be maintained energized by periodically applying a refresh pulse to each energized site in successive rows (or, alternatively, in successive columns) on a multiplexed basis.

As long as the number of rows (or columns) to be multiplexed is not too large, the multiplexing technique just described works quite well. As the number of multiplexed rows (or columns) increases, however, the multiplexing frequency must be increased. Ultimately, this will result in a decrease in the rms voltage across each energized cell and beyond a certain point, the viewing quality begins to deteriorate.

One prior art alternative is to use thermally-addressed pleochroic dye switching to provide a liquid crystal display which has built-in memory. See, for example, S. Lu et al, "Thermally-addressed Pleochroic Dye Switching LCDs," SID Symposium Digest, pp. 238–239 (1982); and S. LeBerre et al., "A Flat Smectic Liquid Crystal Display," SID Symposium Digest, pp. 252–253 (1982). This approach, has several drawbacks, however, including a high power requirement and relatively slow writing speed.

Another prior art solution is to couple each liquid crystal display device with a non-linear device and capacitive storage element. See, for example, D. E. Castleberry et al., "A 5 inch×7 inch Varistor Controlled LC Matrix Display," SID Symposium Digest, pp. 246–247, (1982); R. W. Streater et al., "MIM Addressed LCDs: Status and Prospects," SID Symposium Digest, pp. 248–249 (1982); M. Matsuura et al., "A liquid Crystal Display Device with Thin Film Transistors," SID Symposium Digest, pp. 34–35 (1982); F. C. Luo et al., "Hybrid-Processed TFT Matrix Circuits for Flat Display Panels," SID Symposium Digest, pp. 46–47 (1982). This approach still entails multiplexing, but the addition of the capacitive storage element allows the multiplexing frequency to be increased without critically reducing the rms voltage across the liquid crystal display itself. Unfortunately, the processing yields for this technique are reported to be low, and estimates are that displays embodying it will not be commercially available for quite some time in the future.

Yet another prior art solution is to provide separate sets of row and column conductors for respective sections of the display, thereby allowing the different sections to be addressed independent of one another. An example of this is the Model LM-24002G Graphic Display Unit manufactured by Sharp Electronics Corporation. Prior art displays following this approach, however, have been able to include only two such independently addressable sections—each having its column conductors extend to the center of the display from a respective one of two parallel edges thereof. This is because the prior art does not provide a practical technique for providing electrical connection from an edge of the display to conductors which are associated with an interior section or sections thereof.

SUMMARY OF THE INVENTION

Advantageously, the present invention provides such a technique. More particularly, a display device embodying the principles of the invention includes at least first and second sets of (for example) column conductors disposed on a first side of a body of display material, such as a body of liquid crystal display material. The conductors of the first set are disposed in a first region of the display device and carry signals intended to be applied to the display material in that region. The conductors of the second set are disposed in a second region of the device and carry signals intended to be applied to the display material in that region. In accordance with the invention, a portion each second set conductor passes through the first region, but the signals thereon are prevented from being applied to the display material in the first region by using the first set conductors to shield from the display material that portion of each second set conductor which passes through the first region. In preferred embodiments of the invention, in particular, the portion of each second set conductor that passes through the first region is disposed behind (relative to the display material) a respective first set conductor and is narrower than that first set conductor.

In typical embodiments of the invention, the display device will further include at least first and second sets of (for example) row conductors disposed on a second side of the display material in the first and second regions of the display device in an orientation orthogonal to that of the column conductors.

DETAILED DESCRIPTION

Figure 1:
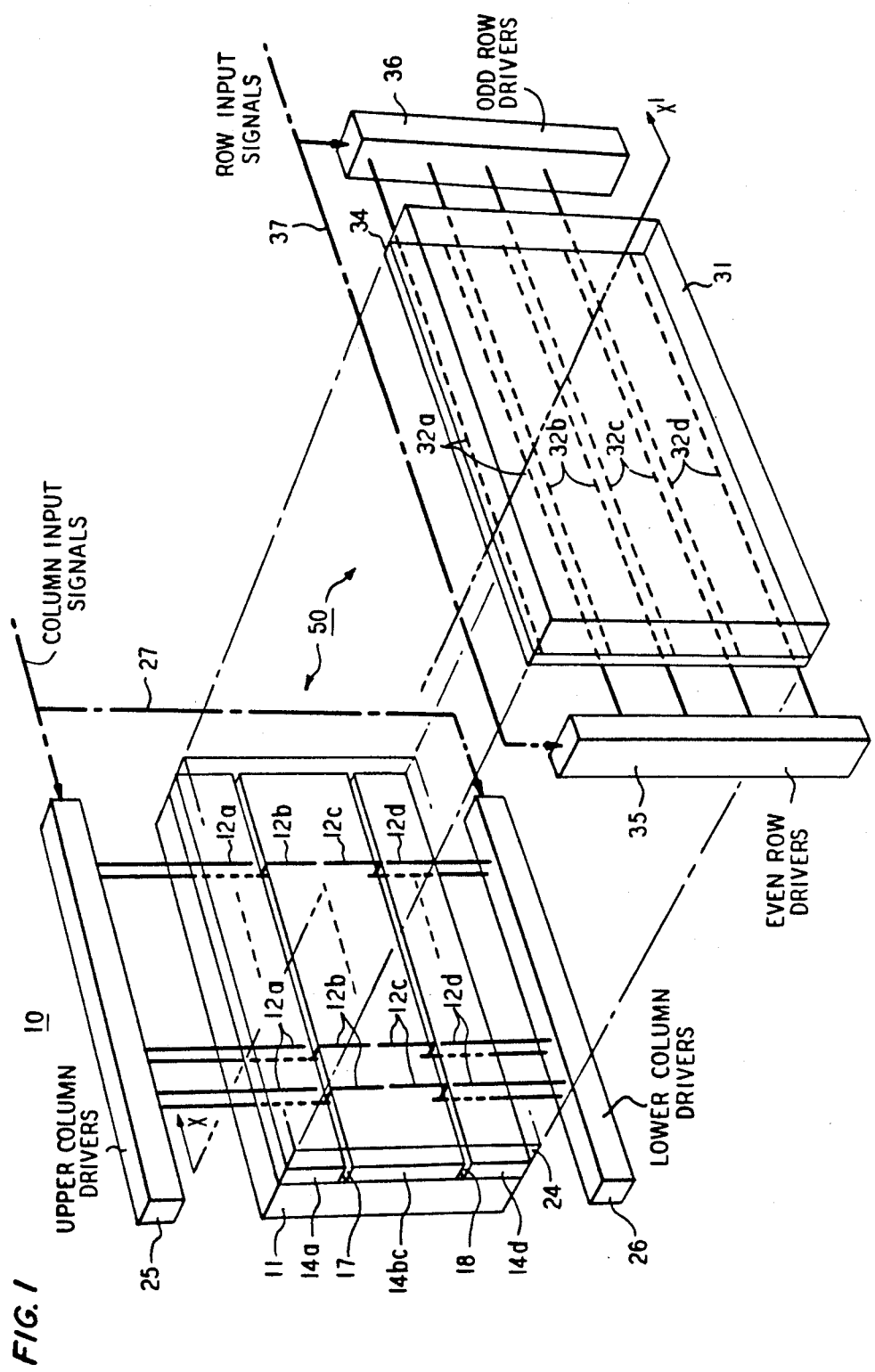
FIG. 1 is an exploded perspective view of a liquid crystal display embodying the principles of the invention.
Figure 2:
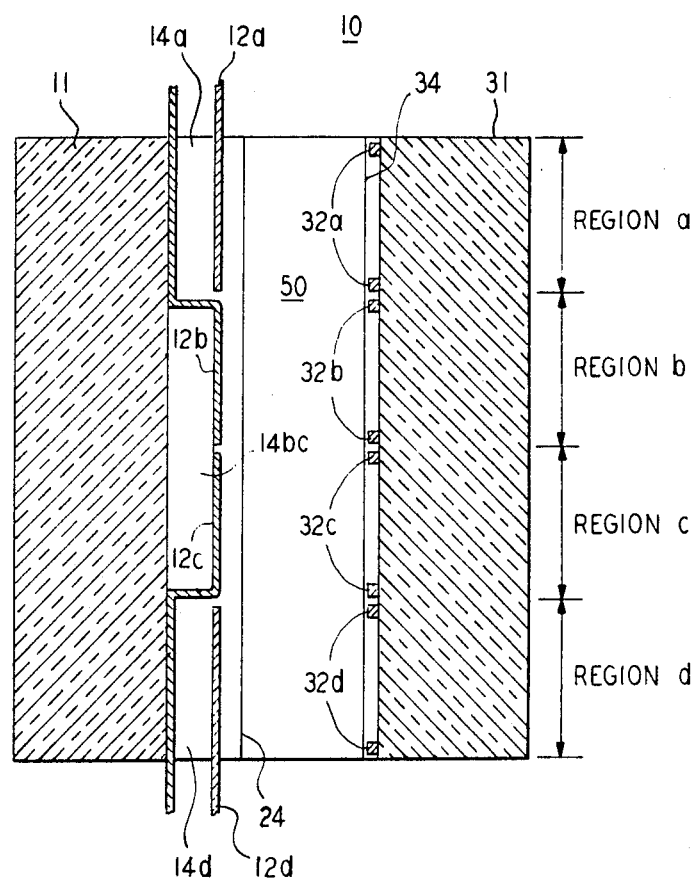
FIG. 2 is a cross-sectional view of the display of FIG. 1 taken through the section x—x'.

Display 10 shown in FIGS. 1 and 2 (not to scale) is comprised of a pair of glass substrates 11 and 31 between which is sealed a body of nematic liquid crystal display material 50. The display is divided into four regions, a, b, c and d, respectively, each of which illustratively includes a respective set of 480 elongate column conductors and 64 elongate row conductors orthogonal thereto. The row conductors within regions, a, b, c and d, which conductors are all parallel to one another, are respectively denoted 32a, 32b, 32c and 32d and are disposed adjacent to—indeed in this embodiment on the inner surface of—substrate 31 and covered with a very thin dielectric layer 34. The column conductors within regions a, b, c and d, which conductors are all parallel to one another, are respectively denoted 12a, 12b, 12c and 12d and are disposed adjacent to the inner surface of substrate 11 and covered with a very thin dielectric layer 24. (For drawing clarity, layer 24 is shown broken away in FIG. 1 and cross-hatching of layers 24 and 34 has been eliminated in FIG. 2.)

Each column/row conductor crossover point in the device defines an associated liquid crystal display site, which is energized by application of appropriate voltages to the associated row and column conductors in a manner well known in the art. These voltages are generated in conventional multiplexed fashion by upper column drivers 25 and lower column drivers 26 and by even row drivers 35 and odd row drivers 36, in response to column and row input signals on cables 27 and 37, respectively. The column and row input signals, in turn, are illustratively generated by a digital computer (not shown). Advantageously, since each of the four regions has its own set of column conductors and its own set of row conductors, the display sites in each of four regions of the display can be addressed concurrently.

The present invention is directed to the problem of how to bring the voltages for column conductors 12b (12c) into region b (c) without having them affect the liquid crystal material in region a (d), through which region conductors 12b (12c) pass on their way to region b (c). In accordance with the invention,, this is accomplished by using column conductors 12a (12d) to shield the voltages on column conductors 12b (12c) from the liquid crystal material in region a (d).

More particularly, such shielding is illustratively accomplished by (1) disposing that portion of each one of column conductors 12b (12c) which passes through region a (d) directly behind a respective one of column conductors 12a (12d), and (2) making each such portion of column conductors 12b (12c) narrower than column conductors 12a (12d). A section of dielectric material 14a (14d) is used to insulate each one of column conductors 12a (12d) from the one of column conductors 12b (12c) that is disposed behind it. And in order to have a uniformly thick liquid crystal layer, the portions of column conductorss 12b (12c) that are in region b (c) are disposed on a section of dielectric material 14bc that is the same thickness as layers 14a and 14d. (Cross-hatching of sections 14a, 14bc and 14d has been eliminated in FIG. 2 for drawing clarity.) Connection between the portion of each one of column conductors 12b (12c) that lies below layer 14a (14d) and on top of layer 14bc is made through a narrow groove 17 (18) that separates layer 14bc from layer 14a (14d).

Typical dimensions for the various components of the display are as follows: spacing between adjacent row conductors and adjacent column conductors, 4 mils; width of conductors 12a, 12d and 32a-d, 16 mils; width of conductors 12b and 12c, 16 mils within regions b and c and 10 mils or smaller within regions a and d; thickness of conductors 12a-d and 32a-d, 200 angstroms; thickness of dielectric sections 14a, 14bc and 14d, 2 microns; thickness of dielectric layers 24 and 34, 250 angstroms; thickness of liquid crystal layer 50, 7 microns; width of grooves 17 and 18, 1-4 mils.

Display 10 can be fabricated using techniques all of which are conventional in the display fabrication art. For example, an illustrative process for fabricating the components on substrate 11 includes the steps of: depositing on substrate 11 those portions of column conductors 12b and 12c that pass through regions a and d, respectively, using electron beam evaporation of indium tin oxide; covering the entire substrate with a layer of polyimide dielectric; photo-etching grooves 17 and 18 thereby to form the three dielectric sections 14a, 14bc and 14d; depositing column conductors 12a and 12d on dielectric sections 14a and 14d, respectively and the remainder of column conductors 12b and 12c on dielectric section 14bc; covering the column conductors with a thin layer of polyimide dielectric to form layer 24, and; rubbing layer 24 to create liquid crystal alignment grooves therein. (Connection of the two portions of each one of column conductors 12b (12c) to one another through groove 17 (18) occurs automatically when the portions deposited on section 14bc are formed.) The commponents on substrate 31 are fabricated using similar steps and the two portions of the display are then joined with the layer of liquid crystal material sandwiched between them. Conventional cross-polarizers are then placed on the outside surface of each substrate and a reflective surface is then placed over one of the cross-polarizers in order to provide a reflective mode of operation.

The foregoing merely illustrates the principles of the invention. For example, a display having more than four regions could be fabricated by using more than two layers of electrodes, with each electrode shielding the one(s) behind it. Moreover, although the invention has been illustrated in the context of a liquid crystal display, the principles of the invention may be applicable to displays using other display materials as well as to displays in which all the electrodes are disposed on one of the substrates.

It will thus be appreciated that those skilled in the art will be able to devise various arrangements which, although not explicitly shown or described herein, embody the principles of the invention.

What is claimed is:

1. A display device including
  a substrate,
  a body of display material adjacent to said substrate, and
  first and second sets of elongate conductors disposed adjacent to said substrate such that the conductors of said first set are substantially parallel to one another and the conductors of said second set are substantially parallel to one another and the conductors of said first set are substantially parallel to the conductors of said second set and such that at least a portion of each first set conductor electrically shields a first portion of a respective second set conductor from said display material, at least said portion of said each first set conductor being spaced from said substrate by a predetermined distance and a second portion of said respective second set conductor being spaced from said substrate by substantially said predetermined distance.

2. The invention of claim 1 wherein said display material is a liquid crystal display material.

3. The invention of claim 1 wheren said each first set conductor is disposed between said display material and said respective second set conductor.

4. The invention of claim 3 wherein said display material is a liquid crystal display material.

5. The invention of claim 1 wherein said second set conductor portion is narrower than the first set conductor that shields it.

6. The invention of claim 5 wherein said display material is a liquid crystal display material.

7. A display device including
a first substrate,
a body of display material adjacent to said first substrate, said display device having first and second regions each of which includes a portion of said substrate and of said display material,
a first set of conductors disposed adjacent to said first substrate in said first region, and
a second set of conductors disposed adjacent to said substrate in said first and second regions, said first and second sets of conductors being disposed with respect to one another such that at least a portion of each first set conductor electrically shields from said display material that portion of a respective second set conductor that is in said first region, at least said portion of said each first set conductor being a predetermined distance from said first substrate and the portion of said respective second set conductor that is in said second region being substantially said predetermined distance from said first substrate.

8. The invention of claim 7 wherein said display material is a liquid crystal material.

9. The invention of claim 7 wherein each said first set conductor is disposed between said display material and said portion of said second set conductor.

10. The invention of claim 9 wherein said display material is a liquid crystal material.

11. The invention of claim 7 wherein the conductors of each of said first and second sets are substantially parallel to each other and to the conductors of the other set.

12. The invention of claim 11 further including a second substrate, respective portions of said second substrate being in said first and second regions, and further including third and fourth sets of conductors disposed adjacent to said second substrate in said first and second regions, respectively, substantially orthogonal to said first and second sets of conductors.

13. The invention of claim 12 wherein said display material is a liquid crystal material.

14. The invention of claim 7 wherein said second set conductor portion is narrower than the first set conductor that shields it.

* * * * *